United States Patent [19]

Zenmei

[11] Patent Number: 5,099,163
[45] Date of Patent: Mar. 24, 1992

[54] BRUSH DEVICE FOR ROTARY ELECTRIC MACHINE

[75] Inventor: Keisaku Zenmei, Hyogo, Japan
[73] Assignee: Mitsubishi Denki K.K., Tokyo, Japan
[21] Appl. No.: 631,315
[22] Filed: Dec. 21, 1990
[30] Foreign Application Priority Data Jan. 8, 1990 [JP] Japan ................. 2-2283

[51] Int. Cl.[5] .................................. H02K 13/00
[52] U.S. Cl. ......................... 310/239; 310/43; 310/89; 310/91
[58] Field of Search ............ 310/43, 71, 89, 239, 310/241, 242, 245, 246, 247, 248, 249, 91

[56] References Cited

U.S. PATENT DOCUMENTS

| 4,355,253 | 10/1982 | Vollbrecht | 310/239 |
| 4,475,053 | 10/1984 | Mayer | 310/239 |
| 4,801,833 | 1/1989 | Dye | 310/239 |
| 4,870,309 | 9/1989 | Hosoya | 310/91 |
| 4,985,654 | 1/1991 | Morikane | 310/249 |

FOREIGN PATENT DOCUMENTS

| 59-132748 | 7/1984 | Japan . |
| 62-129261 | 8/1987 | Japan . |
| 62-145454 | 9/1987 | Japan . |
| 63-17545 | 2/1988 | Japan . |

Primary Examiner—R. Skudy
Attorney, Agent, or Firm—Sughrue, Mion, Zinn, Macpeak & Seas

[57] ABSTRACT

A brush device for rotary electric machine is comprised of an outer frame, a plurality of brush holding member for accommodating brushes, a first support member for supporting a connecting plate and a second support member for supporting a grommet. In the device, each of the brush holding member has a bottom portion which is provided integrally with the outer frame. Further, the first support member and the second support member are provided integrally with the outer frame.

4 Claims, 1 Drawing Sheet

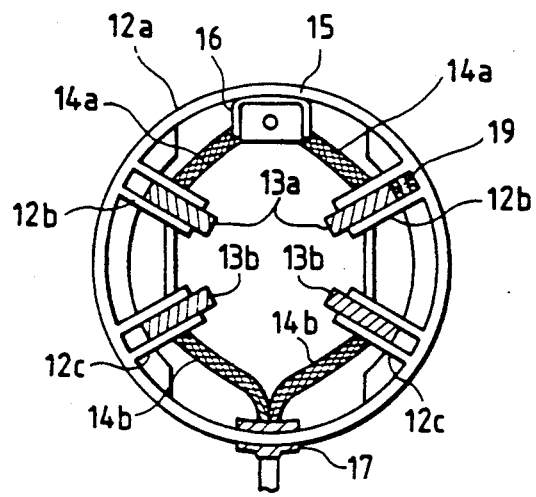
FIG. 1(a)
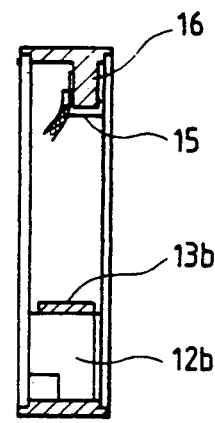
FIG. 1(b)
FIG. 1(c)
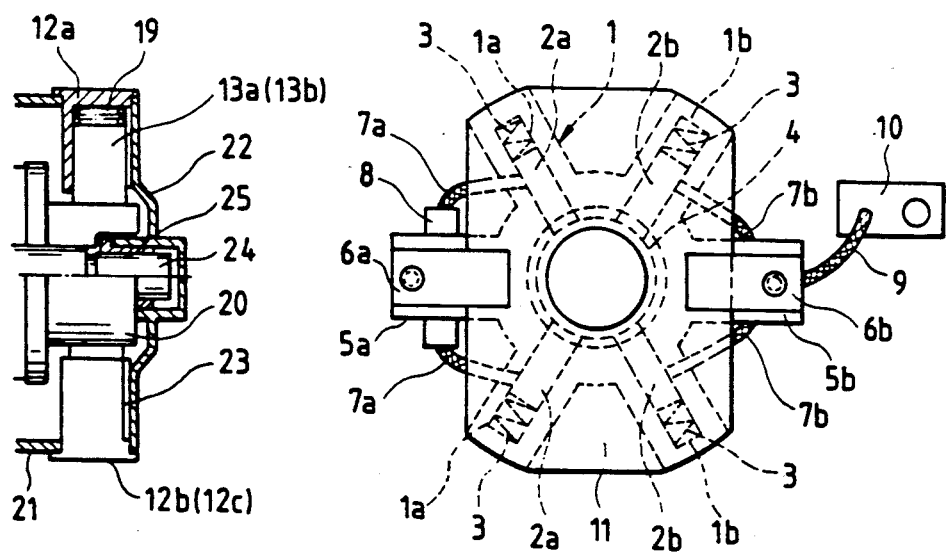
FIG. 2
FIG. 3 PRIOR ART

BRUSH DEVICE FOR ROTARY ELECTRIC MACHINE

BACKGROUND OF THE INVENTION

This invention relates to an improved brush device in a rotary electric machine such as a starter motor.

FIG. 3 is a plan view showing a conventional brush device in the rotary electric machine. In FIG. 3, a brush holding frame 1 is molded of a thermosetting synthetic resin. The brush holding frame 1 has brush holding portions 1a and 1b each of which holds a plus brush 2a or a minus brush 2b. Brush springs 3 are provided within the brush holding portions 1a and 1b. The brush springs 3 urge the brushes 2a and 2b against a commutator 4 so that a tip end of each brush is attached to the commutator 4. In addition, protruding portions 5a and 5b are formed integrally with the brush holding frame 1. Mounting pieces 6a and 6b made of metal are slidably engaged with protruding portions 5a and 5b, respectively. The mounting piece 6a is connected to lead wires 7a connected to minus brushes 2a through a protruding piece 8. In the same way, the mounting piece 6b is connected to lead wires 7b connected to the plus brush 2b. Further, a lead wire 9 is connected at one end to the mounting piece 6b and at the other end to a terminal 10. An insulative plate 11 is used for insulating between the brush holding frame 1 and a rear bracket (not shown). The insulative plate 11 is provided so as to cover substantially all the side walls of the brush holding frame 1.

In the conventional brush device thus constructed, the mounting pieces 6a and 6b which are slidably engaged with protruding portions 5a and 5b are fixed to the rear bracket and are accommodated in the rear bracket. In addition, the mounting piece 6a on the minus side is grounded through the metal rear bracket and the terminal 10 on the plus side is connected to a positive terminal of an electromagnetic switch (not shown).

According to the conventional brush device in rotary electric machine is constructed as described above. When the brush holding frame 1 is installed as a starter motor, the brash holding frame 1 is accommodated in the rear bracket. Therefore, an outer diameter of the brush holding frame 1 and hence a length of brush holding portions 1a and 1b is limited. As a result, there are problems that it is impossible to elongate the length of brushes 2a and 2b so that the service life of brushes 2a and 2b are short. In addition, since the brush holding frame 1 and rear bracket are, respectively, constituted as separate components, there are problems that the conventional brush device becomes heavy in weight with an increased cost.

SUMMARY OF THE INVENTION

An object of the present invention is to eliminate the above-described difficulties accompanying a conventional brush device. More specifically, an object of the present invention is to provide an improved brush device which is light in weight and inexpensive for a long service life.

The foregoing and other objects of the present invention have been achieved by providing a brush device comprising an outer frame; a plurality of brush holding means for accommodating brushes, the brushes each having one of a first polarity and a second polarity and being electrically connected to respective lead wires passing through the brush holding means; a first support member for supporting a connecting plate which is connected to the first polarity of the brushes through the lead wires; and a second support member for supporting a grommet which is connected to the second polarity of brushes through the lead wires; wherein each of the brush holding means has a bottom portion which is provided integrally with the outer frame, and the first support member and the second support member are provided integrally with the outer frame.

According to the present invention, since the outer frame is also used as the bottom portion of the brash holding portion, the length of the brash holding portion can be elongated. Therefore, the length of the brushes can be elongated. In addition, since the outer frame is also used as the frame of rotary electric machine, the weight can be light and the cost can be low. Further, a connecting plate and a support portion of the grommet are formed integrally so that the efficiency of installation can be improved, lead wires can be firmly supported and high reliability can be ensured.

BRIEF DESCRIPTION OF THE DRAWINGS

In the accompanying drawings:

FIG. 1A, 1B and 1C are a front view, a cross-sectional view and a bottom view, respectively, showing one embodiment of a brush device for a rotary electric machine according to the present invention;

FIG. 2 is a sectional view showing essential components, shown in FIG. 1, applied to a starter motor; and FIG. 3 is a front view showing a conventional brush device for a rotary electric machine.

DETAILED DESCRIPTION OF THE PREFERRED EMBODIMENT

FIGS. 1A, 1B and 1C are a front view, a sectional view and a bottom view, respectively, showing one embodiment of a brush device for a rotary electric machine according to the present invention. In these Figures, reference numeral 12a designates a cylinder-shaped outer frame, reference numerals 12b and 12c designate brush holding portions. A bottom portion of the brush holding portions 12b and 12c are formed integrally with the outer frame 12a. All of the outer frame 12a and brush holding portions 12b and 12c are integrally molded of synthetic resin into one piece. In addition, a supporting portion 16 for supporting a U-shaped sectional metal connecting plate 15 is welded to each lead wire 14a connected to the associated minus brush 13a and is formed integrally with the outer frame 12a and the brush holding portion 12b and 12c. Further, a notch 18 for slidably receiving a rubber grommet 17 which holds lead wires 14b connected to plus brushes 13b is provided on the outer frame 12a. The notch 18 is provided diametrically opposite to the connecting plate 15. Oval coil springs 19 are provided within brush holding portions 12b and 12c for urging respective brushes 12b and 12c radially toward the center of the outer frame 12a, that is, a direction of the commutator (not shown).

FIG. 2 shows a construction in case where the brush device is applied to a starter motor. In FIG. 2, reference numeral 20 designates a commutator of an armature. Each of brushes 13a and 13b is slidably contacted with the commutator 20. One side of outer frame 12a is slidably engaged with a yoke 21 of the armature and the other side is fixedly engaged with a rear bracket 22 made of a metal plate. In addition, an insulation sheet 23 is interposed between brush holding portions 12b and 12c and the rear bracket 22 so that brushes 13a and 13b are insulated from the rear bracket 22. Reference numeral 24 designates a rotary shaft of the armature. An end portion thereof is supported by a bearing 25 at a central portion of the rear bracket 22. In addition, the connecting plate 15 (see FIGS 1(a) and (b)) is contacted with a ground circuit such as the rear bracket 22, the yoke 21 and the like through screws (not shown). Each lead wire 14b (see FIG. 1(a)) on the plus side is connected to a plus terminal of an electromagnetic switch (not shown).

With respect to the brush device of rotary electric machine thus constructed, since the bottom portions of brush holding portions 12b and 12c are integrally provided with the outer frame 12a, the length of brush holding portion 12b and 12c can be elongated. Therefore, since the long brushes 13a and 13b can be used, a long service-life of the brush 13a and 13b can be obtained. In addition, since the outer frame 12a is also used as a frame for a starter electric machine, the weight can be reduced. Further, the connecting plate 15 on the minus side and the grommet 17 which holds the lead wires 14b on the plus side are integrally provided with the outer frame 12a so that assembling working becomes easy and the grommet 17 can be firmly supported. Therefore, a high reliability can be insured.

As described above, in a brush device of the rotary electric machine according to the present invention, all the components such as the outer frame used also as a frame for the rotary electric machine, the brush holding portions, the supporting portion for supporting the connecting plate which is connected to the lead wires of one polarity and the supporting portion for supporting the grommet which holds the lead wires of the other polarity are formed integrally with each other so that long brushes can be used. Therefore, a long service life of the brush can be obtained, the weight can be light, the cost can be low, efficiency of installation can be improved and high reliability can be ensured.

What is claimed is:

1. A brush device for a rotary electric machine, comprising:
   an outer frame;
   a plurality of brush holding means for accommodating brushes, said brushes each having one of a first polarity and a second polarity and being electrically connected to respective lead wires passing through said brush holding means;
   a first support member for supporting a connecting plate which is connected to the first polarity of said brushes through said lead wires; and
   a second support member for supporting a grommet which is connected to the second polarity of said brushes through said lead wires;
   wherein each of said brush holding means has a bottom portion which is provided integrally with said outer frame, and said first support member and said second support member are provided integrally with said outer frame.

2. The brush device according to claim 1, wherein each of said brush holding means accommodates said brushes and brush springs, said brush springs being adapted to urge said brushes against a commutator.

3. The brush device according to claim 1, wherein said connecting plate is U-shaped in cross-section.

4. The brush device according to claim 1, wherein said second support member is formed by a notch provided to said outer frame 12a, said notch being provided to an opposite portion to said first support member.

* * * * *